US012608307B2

(12) United States Patent
Agarwal et al.

(10) Patent No.: US 12,608,307 B2
(45) Date of Patent: Apr. 21, 2026

(54) DATA STORAGE DEVICE AND METHOD FOR WRITING UPDATES TO A HOST MEMORY BUFFER USING ASSISTANCE FROM A HOST

(71) Applicant: Sandisk Technologies, Inc., Milpitas, CA (US)

(72) Inventors: Dinesh Kumar Agarwal, Bangalore (IN); Amit Sharma, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/736,977

(22) Filed: Jun. 7, 2024

(65) Prior Publication Data

US 2025/0378020 A1     Dec. 11, 2025

(51) Int. Cl.
  *G06F 12/02*     (2006.01)
  *G06F 3/06*      (2006.01)
  *G06F 13/28*     (2006.01)

(52) U.S. Cl.
  CPC ........ *G06F 12/0246* (2013.01); *G06F 3/0613* (2013.01); *G06F 3/0655* (2013.01); *G06F 3/0679* (2013.01); *G06F 13/28* (2013.01); *G06F 2212/7201* (2013.01); *G06F 2212/7203* (2013.01); *G06F 2213/0026* (2013.01)

(58) Field of Classification Search
  None
  See application file for complete search history.

(56) References Cited

U.S. PATENT DOCUMENTS

| | | | | |
|---|---|---|---|---|
| 9,977,612 B1 * | 5/2018 | Lo | ........................... | G06F 3/064 |
| 10,007,433 B2 | 6/2018 | Hahn | | |
| 10,268,584 B2 | 4/2019 | Hahn | | |
| 10,521,118 B2 | 12/2019 | Benisty et al. | | |
| 10,642,496 B2 | 5/2020 | Benisty et al. | | |
| 10,929,285 B2 | 2/2021 | R et al. | | |
| 11,604,735 B1 * | 3/2023 | Segev | ................. | G06F 12/0857 |
| 11,698,751 B2 * | 7/2023 | Agarwal | ............... | G06F 3/0656 711/154 |
| 2014/0337560 A1 * | 11/2014 | Chun | ................... | G06F 12/0246 711/103 |

(Continued)

OTHER PUBLICATIONS

Vadhiraj Sankaranarayanan. "Error Correction Code (ECC) in DDR Memories." Oct. 2020. https://www.synopsys.com/articles/ecc-memory-error-correction.html.*

*Primary Examiner* — Nathan Sadler
(74) *Attorney, Agent, or Firm* — Crowell & Moring LLP

(57)     ABSTRACT

A data storage device and method are disclosed for writing updates to a host memory buffer using assistance from a host. In one embodiment, a data storage device is provided comprising a memory and one or more processors. The one or more processors, individually or in combination, are configured to: write data in a first location in the host memory buffer, wherein the first location is allocated for exclusive use by the data storage device; and write a plurality of updates to the data in a second location in the host memory buffer using one-way traffic on a bus between the data storage device and the host, wherein the second location is allocated for host memory buffer updates. The host is configured to copy the plurality of updates from the second location to the first location. Other embodiments are provided.

6 Claims, 9 Drawing Sheets

(56)          References Cited

U.S. PATENT DOCUMENTS

| | | | |
|---|---|---|---|
| 2020/0151055 A1* | 5/2020 | Eom | G06F 13/28 |
| 2022/0391132 A1* | 12/2022 | Agarwal | G06F 12/0895 |
| 2023/0129363 A1* | 4/2023 | Wei | G06F 3/0611 |
| | | | 711/103 |
| 2023/0153026 A1* | 5/2023 | Lee | G06F 3/0656 |
| | | | 711/154 |
| 2023/0153027 A1* | 5/2023 | Hahn | G06F 3/0656 |
| | | | 711/154 |
| 2023/0418760 A1* | 12/2023 | Hara | G06F 12/0868 |
| 2025/0021478 A1* | 1/2025 | Garg | G06F 12/0292 |

* cited by examiner

DATA STORAGE DEVICE AND METHOD FOR WRITING UPDATES TO A HOST MEMORY BUFFER USING ASSISTANCE FROM A HOST

BACKGROUND

A host memory buffer refers to volatile memory in a host that is allocated for exclusive use by a data storage device. On occasion, a data storage device may need to update data it has written in the host memory buffer, which can involve two-way traffic on a bus between the data storage device and the host. For example, the data storage device can read the data from a location in the host memory buffer, update the data, align the updated data with an error correction code (ECC) packet, and write the updated data back to its original location in the host memory buffer.

DETAILED DESCRIPTION

Figures 1A, 1B, 1C:
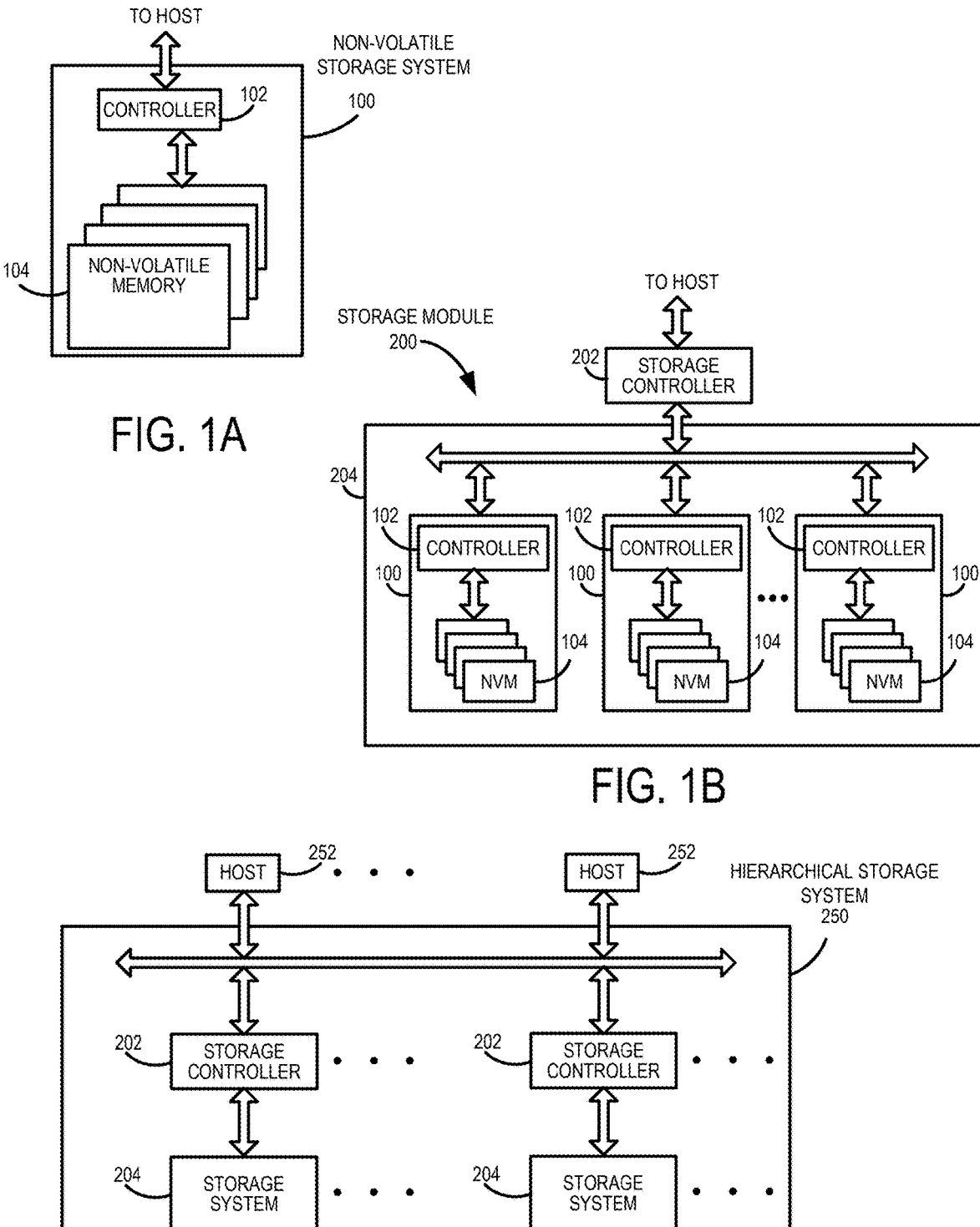
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for writing updates to a host memory buffer using assistance from a host. In one embodiment, a data storage device is provided comprising a memory and one or more processors. The one or more processors, individually or in combination, are configured to: write data in a first location in a host memory buffer in a host, wherein the first location is allocated for exclusive use by the data storage device; and write a plurality of updates to the data in a second location in the host memory buffer using one-way traffic on a bus between the data storage device and the host, wherein the second location is allocated for host memory buffer updates; wherein the host is configured to copy the plurality of updates from the second location in the host memory buffer to the first location in the host memory buffer.

In some embodiments, the one or more processors, individually or in combination, are further configured to accumulate the plurality of updates before writing them to the second location in the host memory buffer.

In some embodiments, the one or more processors, individually or in combination, are further configured to write the plurality of updates to the second location in the host memory buffer as a direct memory access (DMA) burst.

In some embodiments, the one or more processors, individually or in combination, are further configured to generate error correction code for each update of the plurality of updates.

In some embodiments, the plurality of updates is sent to the host without error correction code and the host is further configured to generate the error correction code for the plurality of updates.

In some embodiments, each update of the plurality of updates comprises four bytes.

In some embodiments, the plurality of updates is sent to the host without aligning the plurality of updates with an error correction code (ECC) packet.

In some embodiments, the host is further configured to copy the plurality of updates using a volatile-memory-to-volatile-memory copy operation.

In some embodiments, the host is further configured to perform an error check before copying the plurality of updates from the second location in the host memory buffer to the first location in the host memory buffer.

In some embodiments, the memory comprises a three-dimensional memory.

In another embodiment, a method is provided that is performed in a host comprising a host memory buffer for use by a data storage device. The method comprises: receiving, from the data storage device, an update to data stored in a first location in the host memory buffer; storing the update in a second location in the host memory buffer; and copying the update from the first location in the host memory buffer to the second location in the host memory buffer.

In some embodiments, the first location in the host memory buffer is allocated for exclusive use by the data storage device and the second location is allocated for host memory buffer updates.

In some embodiments, the update involves one-way traffic on a bus between the data storage device and the host.

In some embodiments, the method further comprises receiving a plurality of accumulated updates from the data storage device.

In some embodiments, the plurality of accumulated updates is received from the data storage device via a direct memory access (DMA) burst.

In some embodiments, the update is received with error correction code.

In some embodiments, the method further comprises generating error correction code for the update.

In some embodiments, the update is copied using a volatile-memory-to-volatile-memory copy operation.

In some embodiments, the method further comprises performing an error check before copying the update.

In another embodiment, a data storage device is provided comprising: a memory; and means for sending, to a dedicated update area in a host memory buffer in a host, an update to data stored in an area in the host memory buffer that is allocated for use by the data storage device, wherein a host-assisted copy operation is used to copy the data from the dedicated update area to the area allocated for use by the data storage device.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
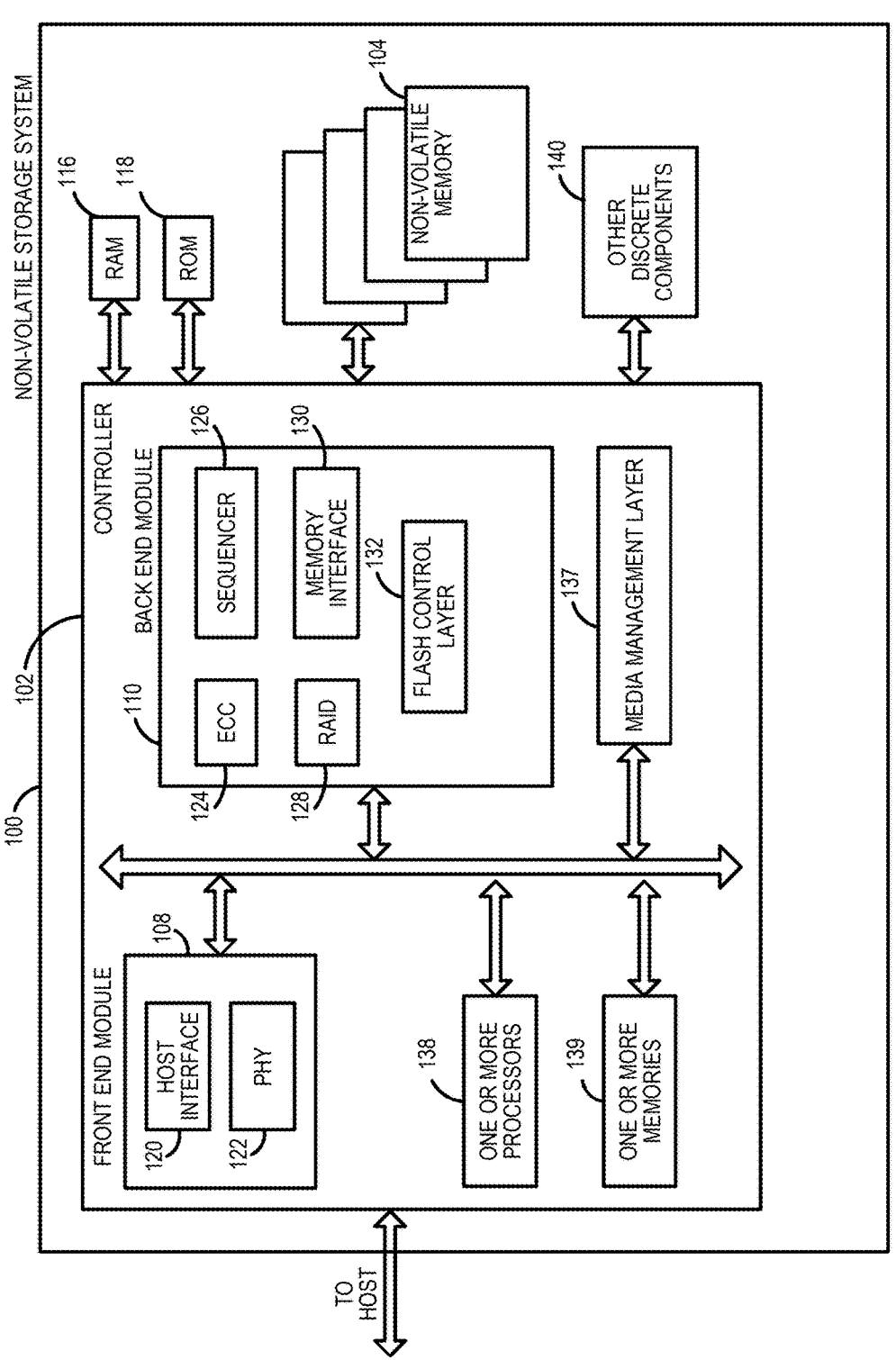
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
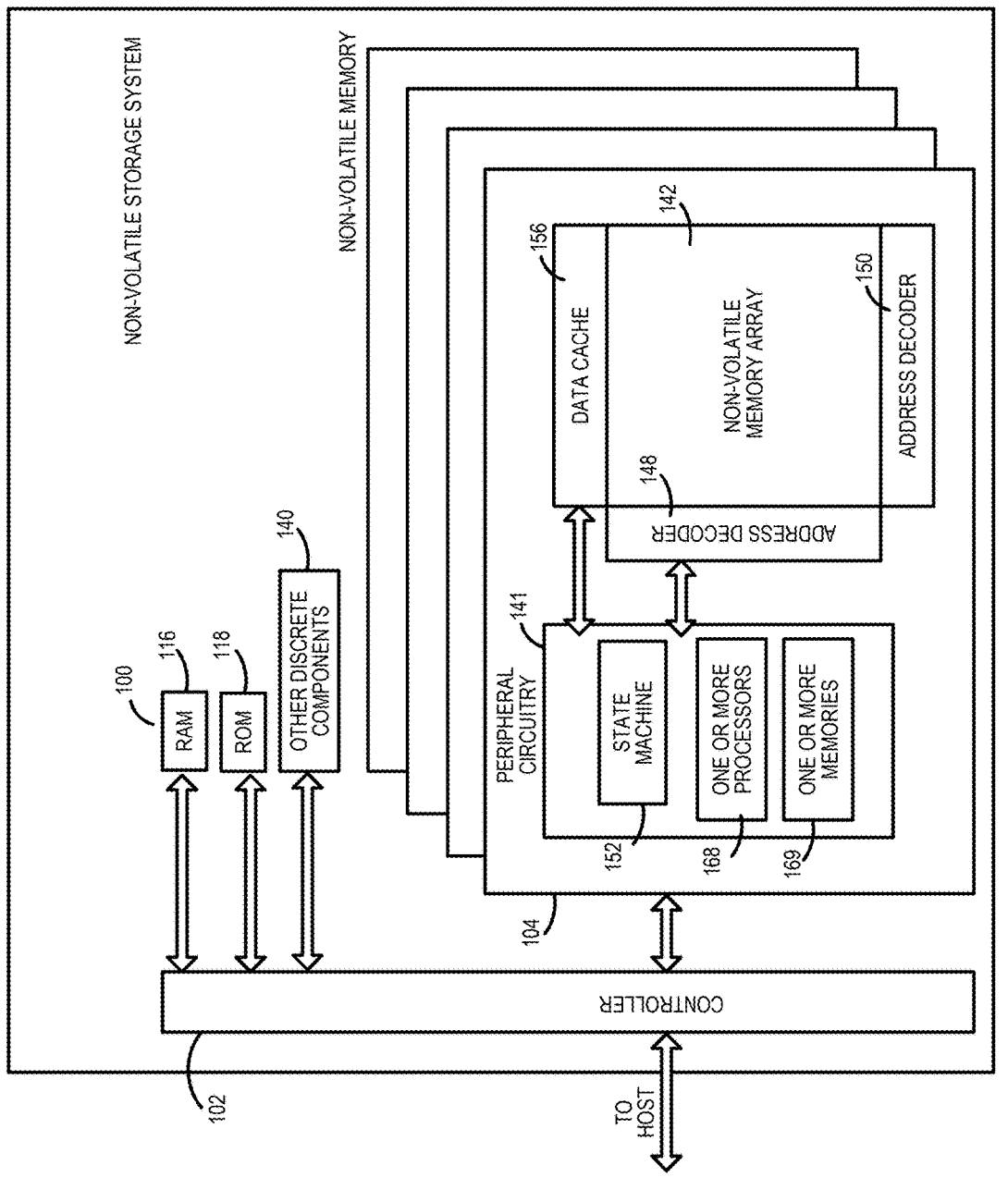
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
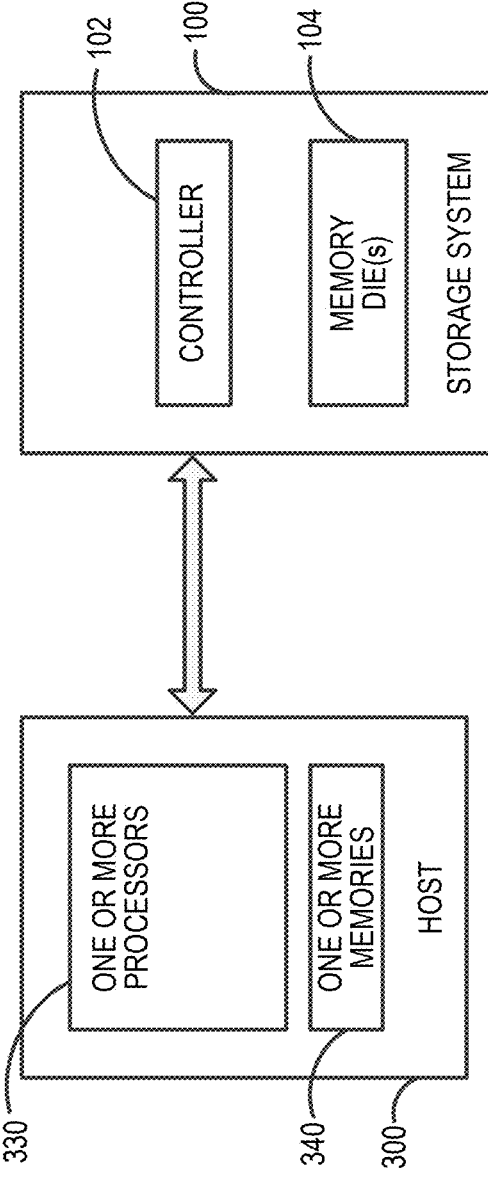
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform, individually or in combination, the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

The one or more memories 340 in the host 300 can also be used as a host memory buffer (HMB). For example, in the Non-Volatile Memory Express (NVMe) specification, a host memory buffer is volatile memory allocated for exclusive use by the data storage device's controller. Data in the host memory buffer is not modified or accessed proactively by the host (i.e., data is guaranteed to be valid), and the host is obligated to notify the data storage device's controller before any operation that might lead to data loss (e.g., in case of power loss or in case the host might need the buffer). In such cases, the host lets the data storage device's controller acknowledge the operation before the data is lost. An HMB descriptor list on the host can be used to maintain a listing of entries associated with host data buffers for exclusive use by the data storage device's controller. During initialization, the host software may provide the HMB descriptor list to the data storage device for exclusive use by the data storage device's controller.

On occasion, the controller 102 of the data storage device 100 may need to update data stored in the HMB. For example, if the controller 102 uses the HMB to store a logical-to-physical address translation table for the data storage device's non-volatile memory 104, the controller 102 may need to update the table stored in the HMB as data is written/moved/erased in the non-volatile memory 104. In some environments, such updates involve two-way traffic on a bus (e.g., a PCIe interface) between the data storage device and the host. For example, the data storage device can read the data from a location in the host memory buffer, update the data, align the updated data with an error correction code (ECC) packet, and write the updated data back to its original location in the host memory buffer.

Figure 4:
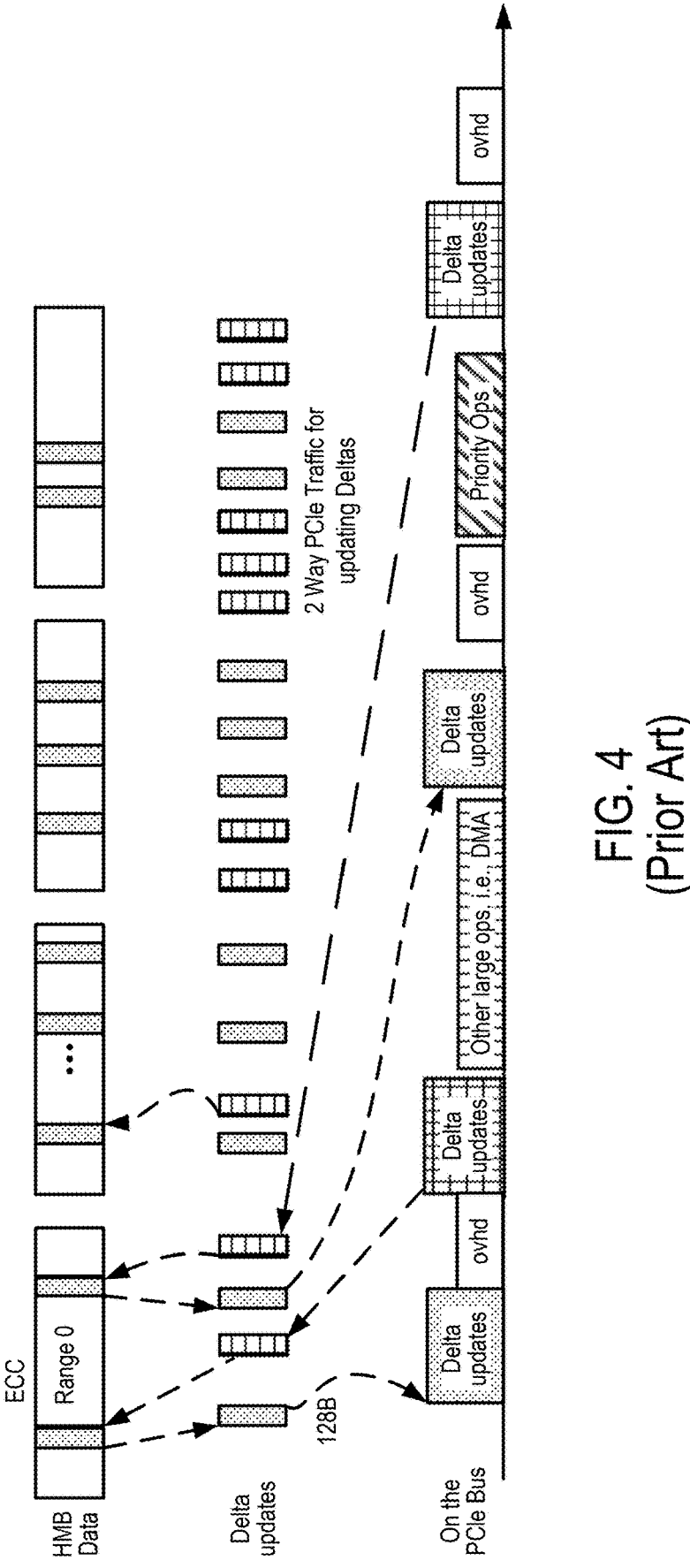
FIG. 4 is an illustration of additional overhead that can be created during a host memory buffer update.

In performance-critical scenarios when the PCIe interface is heavily utilized, performing HMB updates in this fashion can create additional overhead on the interface/bus, especially for a relatively-short update of four bytes. This problem is illustrated in FIG. 4. As shown in FIG. 4, first, the update packet is aligned with an error correction code (ECC) packet (around 128 bytes), and then two-way PCIe traffic is generated, which has relatively-high overhead. So, even though the update is only four bytes, ECC is written for the entire 128-byte packet. As such, using two-way PCIe traffic and sending ECC-packet-aligned data to the PCIe interface can impact performance/latencies when the PCIe interface is also being utilized for data transfer.

The following embodiments can be used to address this problem. In one embodiment, instead of using two-way PCIe traffic to write relatively-short updates back to the original HMB location that stored the pre-updated version of the data, one-way PCIe traffic is used to write the data to another location in the HMB, with the host 300 later copying the data to the original location. To do accomplish this, multiple short updates can be accumulated and sent to a dedicated HMB update space for updates (instead of re-writing the data in the original HMB space) as a direct memory access (DMA) burst. A host-assisted copy can be used to later copy the updates from the dedicated HMB update space to the original HMB space after an error check is performed on the accumulated data. These embodiments will be described in more detail in conjunction with the following examples. It should be understood that these are merely examples and that other implementations can be used. Accordingly, the details provided herein should not be read into the claims unless expressly recited therein.

Figure 5:
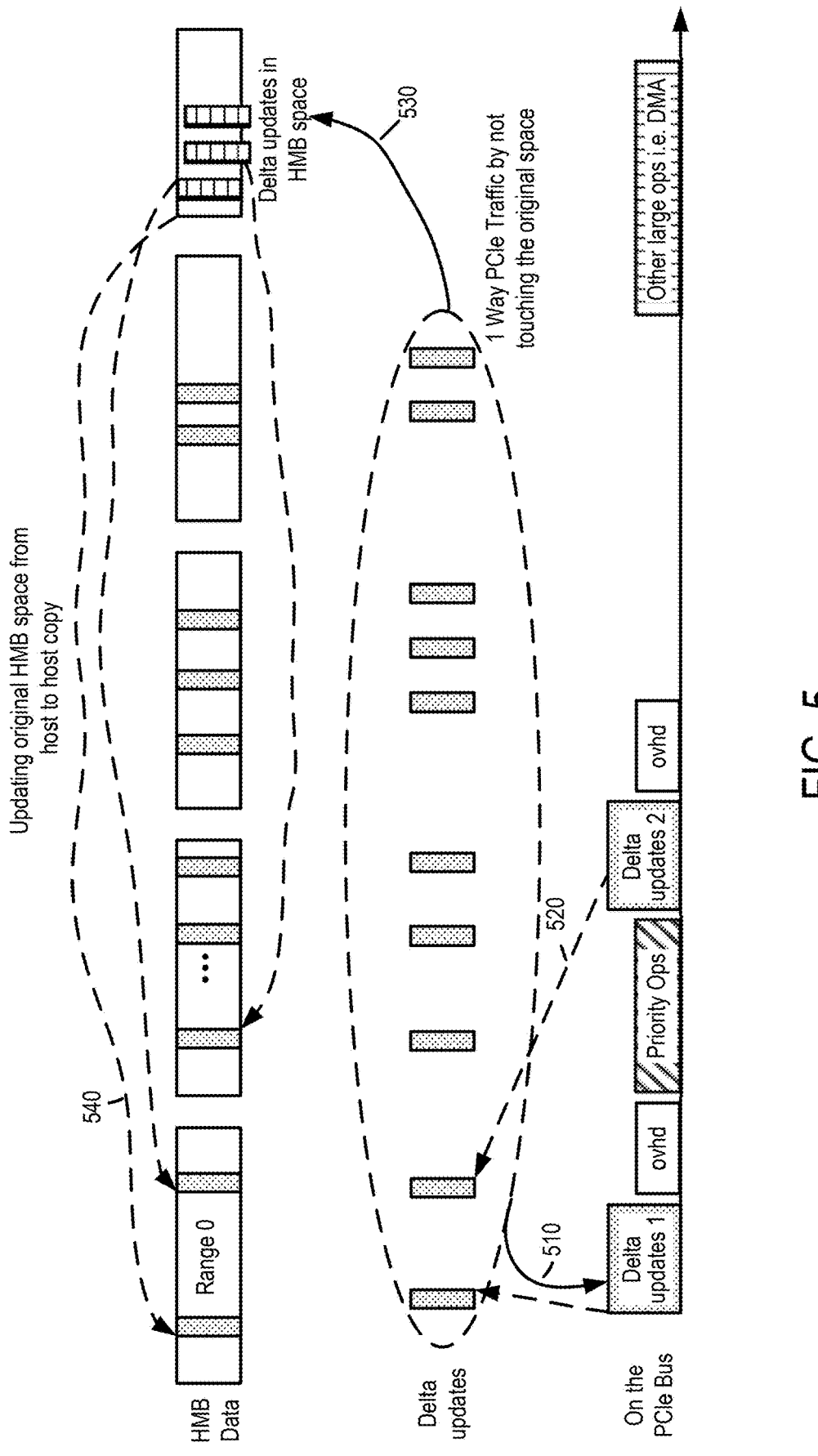
FIG. 5 is an illustration of a method of an embodiment in which one-way bus traffic is generated by writing updates to a dedicated space in a host memory buffer.

Turning again to the drawing, FIG. 5 is an illustration of a method of an embodiment in which one-way bus traffic is generated by writing HMB updates to a dedicated HMB-update space in the HMB (instead of the location in the HMB where the original data is stored). As shown in FIG. 5, in this method, the controller 102 of the data storage device 100 write small HMB updates (here, Delta 1 and Delta 2 updates) in a dedicated space in the HMB (510, 520). Each delta update has its own ECC. Since there are a limited and relatively-small number of delta entries, ECC space overhead should not be an issue (530). Finally, the small delta updates are copied from the dedicated update space back to the location in the HMB that stores the original version of the data (540).

Figure 6:
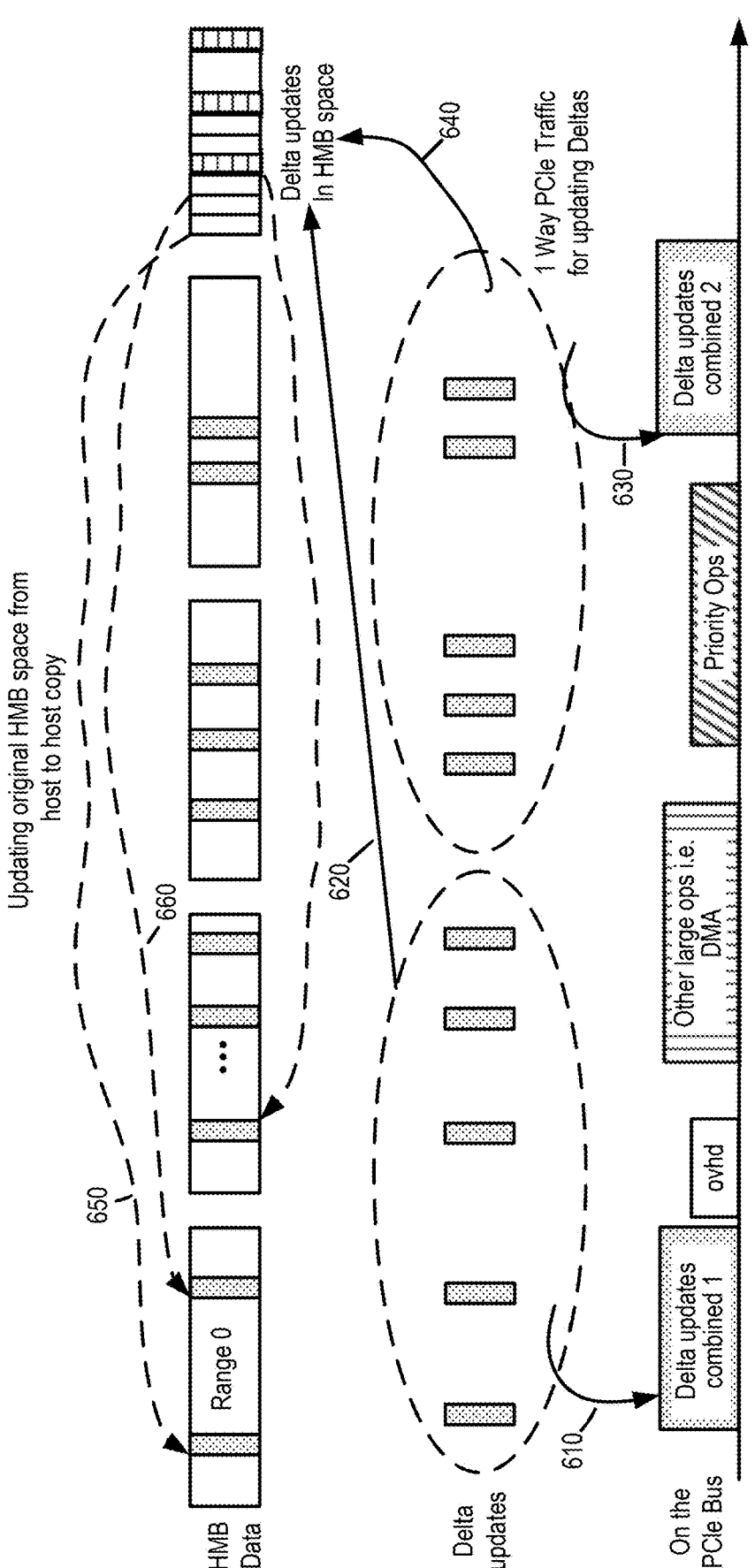
FIG. 6 is an illustration of a method of an embodiment for accumulating short updates.

As mentioned above, in the example in FIG. 5, each delta update has its own ECC. In another embodiment (shown in FIG. 6), instead of each delta update having its own ECC, ECC is generated for accumulated short updates. That is, in this method, multiple short updates are combined, and common ECC is generated in the dedicated space in the HMB. Because ECC is not generated for every update, the updates are faster. As shown in FIG. 6, the controller 102 accumulates small delta updates before writing them to the dedicated update space in the HMB (610). ECC is generated per the accumulated delta update (620). Another set of small updates are combined (630), and ECC is accumulated for that (640). Then, the small delta updates are updated in the original HMB space one-by-one using a host copy operation (650, 660).

Figure 7:
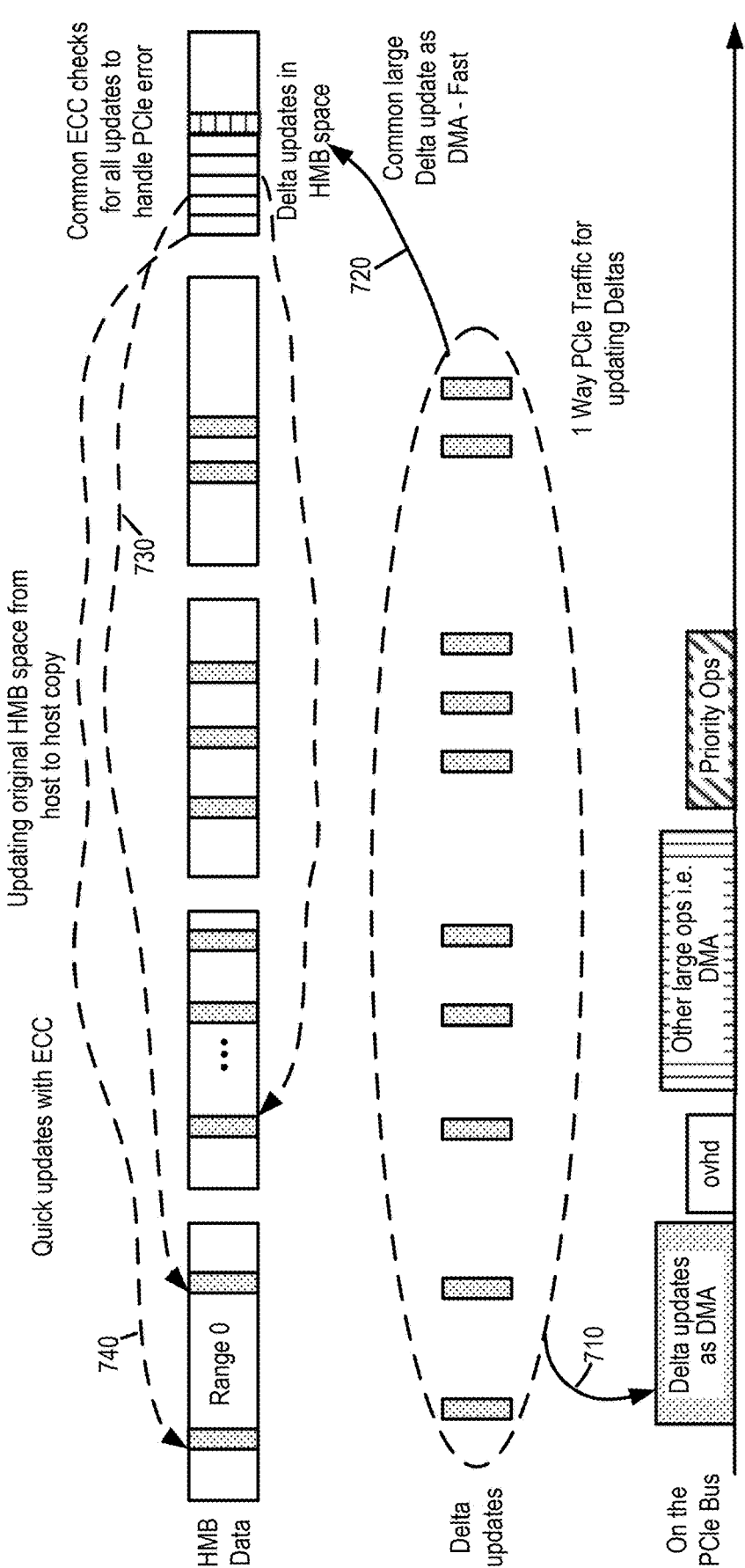
FIG. 7 is an illustration of a method of an embodiment for sending short updates as a direct memory access (DMA) burst.

In one embodiment (shown in FIG. 7), short HMB updates are written as a direct memory access (DMA) burst. This method can be an extension of the embodiment discussed above where ECC is generated for accumulation updates. Here, those combined shorter updates are sent as DMA continuous traffic, thus further reducing the setup-related delay multiple times. As shown in FIG. 7, small delta updates are accumulated before writing them to a dedicated space in the HMB (710). These updates are sent as a DMA burst, thereby reducing additional bus overhead (720). Common ECC checks are performed for all updates to handle bus (PCIe) error for a DMA chunk (730). Then, small delta updates are updated in the original HMB space one-by-one using a host copy operation (740).

Figure 8:
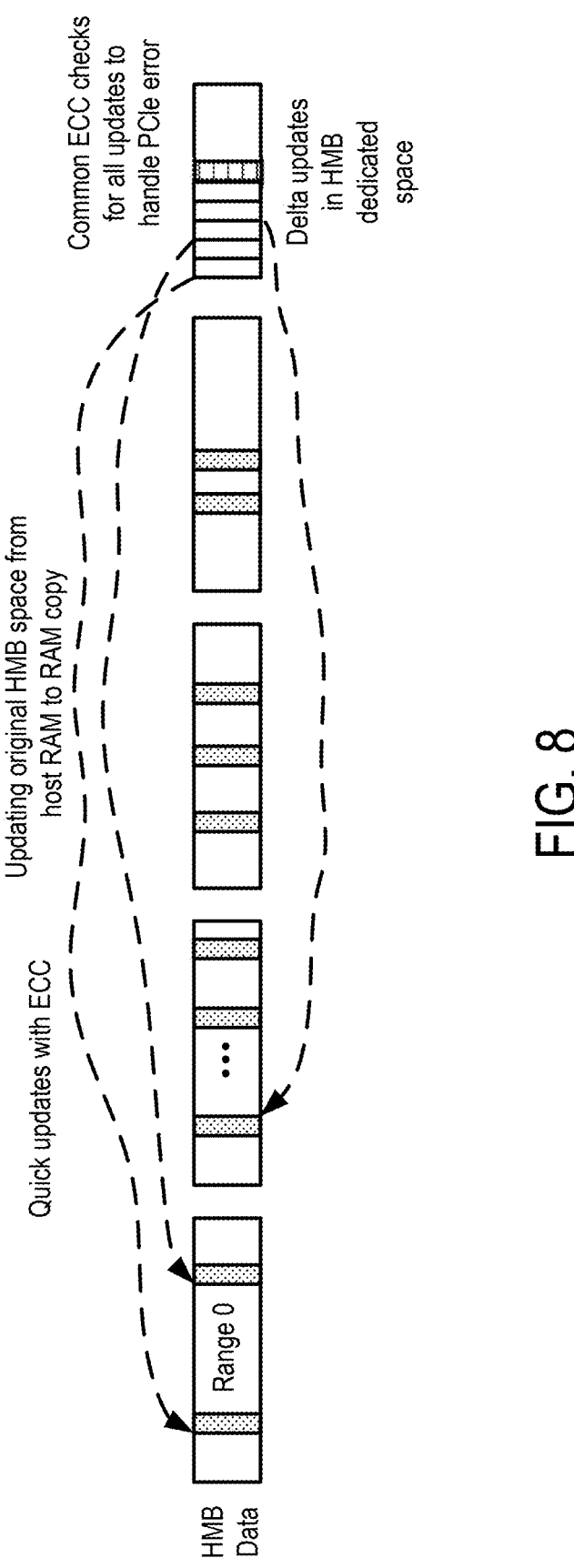
FIG. 8 is an illustration of a method of an embodiment for host-assisted copy from a dedicated space to an original space.

As mentioned in the above examples, after the HMB updates are written in a dedicate HMB-update space in the HMB, the updates are transferred from the dedicated space to designed, original HMB space using a host-assisted copy operation after a "sanity" error check. FIG. 8 illustrates an example of this operation. As shown in FIG. 8, in this example, once the dedicated space is populated, the data can be read from the dedicated space and, in the background, can be updated to the original space after a sanity ECC check by using a host RAM-to-RAM copy operation.

There are several advantages associated with these embodiments. For example, these embodiments can be used to improve overall performance and reduce latencies. For example, these embodiments can reduce traffic on the PCIe bus to one-way traffic and reduce the size of the update (e.g., four-byte updates will take four bytes of traffic on the PCIe bus upstream compared to 128 bytes upstream and downstream, which is a 64-times reduction in data traffic for short random updates). As another example, these embodiments can reduce other setup overheads on the PCIe interface (e.g., 256 bytes or 1 kilobyte compared to a PCIe setup overhead for each update of four bytes, which is at least a 32-times reduction).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method comprising:

performing in a host comprising a host memory buffer for use by a data storage device:

sending, to the data storage device, a descriptor list identifying locations in the host memory buffer that are allocated for exclusive use by the data storage device, wherein some of the locations are allocated for host memory buffer updates;

receiving, from the data storage device, a plurality of data to be written in locations in the host memory buffer that are allocated for exclusive use by the data storage device but not allocated for host memory buffer updates;

receiving, from the data storage device, a direct memory access (DMA) burst comprising an accumulated plurality of updates to the plurality of data and error correction code for the accumulated plurality of updates to be written in the locations in the host memory buffer that are allocated for host memory buffer updates;

performing a common error correction code check on the accumulated plurality of updates using the generated error correction code; and copying each update of the plurality of accumulated updates from its location in the host memory buffer to the location in the host memory buffer of the respective data of the plurality of data being updated using a one-by-one host RAM-to-RAM copy operation.

2. A data storage device comprising:

a memory; and means for:

receiving, from a host, a descriptor list identifying locations in a host memory buffer in the host that are allocated for exclusive use by the data storage device, wherein some of the locations are allocated for host memory buffer updates;

writing a plurality of data in a locations in the host memory buffer in the host that are allocated for exclusive use by the data storage device but not allocated for host memory buffer updates;

accumulating a plurality of updates to the plurality of data;

generating error correction code for the accumulated plurality of updates; and writing the accumulated plurality of updates and the generated error correction code using a direct memory access (DMA) burst on a bus between the data storage device and the host to the locations in the host memory buffer that are allocated for host memory buffer updates;

wherein the host is configured to copy each update of the plurality of accumulated updates from its location in the host memory buffer to the location in the host memory buffer of the respective data of the plurality of data being updated using a one-by-one host RAM-to-RAM copy operation after a common error correction code check is performed on the accumulated plurality of updates using the generated error correction code.

3. A data storage device comprising:

a memory; and one or more processors, individually or in combination, configured to:

receive, from a host, a descriptor list identifying locations in a host memory buffer in the host that are allocated for exclusive use by the data storage device, wherein some of the locations are allocated for host memory buffer updates;

write a plurality of data in locations in the host memory buffer in the host that are allocated for exclusive use by the data storage device but not allocated for host memory buffer updates;

accumulate a plurality of updates to the plurality of data;

generate error correction code for the accumulated plurality of updates; and write the accumulated plurality of updates and the generated error correction code using a direct memory access (DMA) burst on a bus between the data storage device and the host to the locations in the host memory buffer that are is allocated for host memory buffer updates;

wherein the host is configured to copy each update of the plurality of accumulated updates from its location in the host memory buffer to the location in the host memory buffer of the respective data of the plurality of data being updated using a one-by-one host RAM-to-RAM copy operation after a common error correction code check is performed on the accumulated plurality of updates using the generated error correction code.

4. The data storage device of claim 3, wherein each update of the plurality of updates comprises four bytes.

5. The data storage device of claim 3, wherein the plurality of updates is sent to the host without aligning the plurality of updates with an error correction code (ECC) packet.

6. The data storage device of claim 3, wherein the memory comprises a three-dimensional memory.

* * * * *